United States Patent
Vainer

(10) Patent No.: US 9,713,883 B2
(45) Date of Patent: Jul. 25, 2017

(54) METHOD AND DEVICE FOR POLYMER PULVERISATION EXTRUSION

(71) Applicant: POLYMERIC POWDERS COMPANY PTY LTD, Armadale, VIC (AU)

(72) Inventor: Michael Vainer, Caulfield North (AU)

(73) Assignee: POLYMERIC POWDERS COMPANY PTY LTD, Keysborough, Vic (AU)

( * ) Notice: Subject to any disclaimer, the term of this patent is extended or adjusted under 35 U.S.C. 154(b) by 162 days.

(21) Appl. No.: 14/435,285

(22) PCT Filed: Jan. 9, 2013

(86) PCT No.: PCT/AU2013/000005
§ 371 (c)(1),
(2) Date: Apr. 13, 2015

(87) PCT Pub. No.: WO2014/107758
PCT Pub. Date: Jul. 17, 2014

(65) Prior Publication Data
US 2015/0328801 A1    Nov. 19, 2015

(51) Int. Cl.
| | | |
|---|---|---|
| B29B 17/04 | (2006.01) |
| B29B 7/60 | (2006.01) |
| B29B 13/10 | (2006.01) |
| B29B 17/00 | (2006.01) |
| B29C 47/36 | (2006.01) |
| B29C 47/92 | (2006.01) |
| B29C 47/66 | (2006.01) |
| B29K 105/26 | (2006.01) |
| B29B 7/72 | (2006.01) |
| B29K 21/00 | (2006.01) |

(52) U.S. Cl.
CPC .............. *B29B 17/04* (2013.01); *B29B 7/60* (2013.01); *B29B 13/10* (2013.01); *B29B 17/00* (2013.01); *B29C 47/369* (2013.01); *B29C 47/661* (2013.01); *B29C 47/92* (2013.01); *B29B 7/728* (2013.01); *B29B 2017/0464* (2013.01); *B29K 2021/00* (2013.01); *B29K 2105/26* (2013.01); *Y02W 30/62* (2015.05)

(58) Field of Classification Search
None
See application file for complete search history.

(56) References Cited

FOREIGN PATENT DOCUMENTS

| | | |
|---|---|---|
| EP | 1 298 693 | 12/1972 |
| JP | 7-227846 H | 8/1995 |
| WO | 2004/050320 A1 | 6/2004 |

OTHER PUBLICATIONS

International Search Report dated Mar. 4, 2013 from PCT/AU2013/000006, 3 pages.

*Primary Examiner* — Mark Rosenbaum
(74) *Attorney, Agent, or Firm* — Ohlandt, Greeley, Ruggiero & Perle, LLP

(57) ABSTRACT

The present invention generally relates to polymeric materials pulverization. More particularly, the present invention relates to an extrusion method and device for producing particulate deformed polymers having a more useful resultant devulcanized surface area for downstream industrial usage. Specifically, the present invention relates to a pulverization extrusion method and device that utilizes the herein described specific combination of variable feed screw torque and variable main screw speed together with coupled temperature control of the extruder barrel and extruder main screw.

15 Claims, 9 Drawing Sheets

Fibre reinforced rubber degradation graph

FTIR showing devulcanization with reference to wavenumbers 1539 cm⁻1 & 1648 cm⁻1

METHOD AND DEVICE FOR POLYMER PULVERISATION EXTRUSION

FIELD OF INVENTION

The present invention generally relates to deformation of polymeric materials via pulverization extrusion into crumb. More particularly, the present invention relates to an extrusion method and device for producing particulate deformed polymers having a more useful resultant devulcanized surface area for downstream industrial usage. Specifically, the present invention relates to a pulverization extrusion method and device that utilizes the herein described specific combination of variable feed screw torque and variable main screw speed together with coupled temperature control of the extruder barrel and extruder main screw.

While it will be convenient to describe the present invention with reference to processing of end of useful life rubber products such as used tyres and used rubber conveyor belts, the invention is not limited to that application, and may be used for processing other types of waste polymeric materials.

Where used herein, the term 'waste' polymeric material is intended to be interpreted broadly, for example, to refer to polymeric material that is no longer required for its original application or that is created as excess or a by-product from an industrial process.

Where used herein, the term 'crumb' refers to particulate material of a few centimeters in size and smaller.

BACKGROUND TO THE INVENTION

The discussion throughout this specification comes about due to the realization of the inventor and/or the identification of certain related art problems by the inventor. Moreover, any discussion of material such as documents, devices, acts or knowledge in this specification is included to explain the context of the invention in terms of the inventor's knowledge and experience and, accordingly, any such discussion should not be taken as an admission that any of the material forms part of the prior art base or the common general knowledge in the relevant art in Australia, or elsewhere.

Polymeric materials incorporate a wide range of polymers including natural rubber co-polymers and synthetic rubbers such as SBR (styrene butadiene rubber) and butadiene rubber, nitride rubber, isoprene rubber, neoprene rubber and polysulphide rubber. A large variety of other organic and inorganic chemicals are also added to polymeric products such as tyres and rubber conveyor belts including vulcanizing agents, accelerators, retardants, pigments, fillers, reinforcing agents, softeners, anti-oxidants and desiccants.

The pulverization extrusion process described herein can be used in the effective reprocessing of the said waste polymeric materials, whereby the realization by the inventor enables specific utilization of extrusion in relation to the claims of this invention to precisely tailor the resultant extruded particulate polymeric material in having a more useful particulate size and associated surface area to suit the requirements of further downstream value-add processes for enabling the increased usage in industry of the said waste polymeric materials.

Pulverizing by Extrusion

Before the waste polymeric material can become more advantageous for downstream utilization in industry, it must be reduced to small sized particles by methods such as pulverizing. Pulverization techniques for polymers typically rely upon screw extruders imposing compressive shear on the polymer at specific temperatures depending on the polymer.

Based on this methodology, the solid state shear extrusion pulverization of waste polymeric material using an extruder that can achieve pulverization has been proposed by the present invention, the said invention also more efficiently and advantageously causing simultaneous resultant deformation and surface devulcanization of the said waste polymeric material.

One of the main problems associated with pulverization using an extruder is controlling the large amounts of heat generated due to the compression and shearing actions in the pulverization zone.

Further, there is a need for optimizing the pulverization extruder and pulverization extrusion process that can provide product tailored to suit the requirements of downstream industrial processes.

Extrusion Generally

It is known that extruders squeeze a feed material, applying pressure until it is ejected from the extruder. There are many different variations of extrusion equipment but most typically they include a hopper for holding and feeding raw material, and a hydraulically or mechanically driven means for applying pressure. Most extruders include a die for shaping the extruded end product.

The means for applying pressure typically include a single or twin screw auger powered by an electric motor, or a ram driven by hydraulic pressure. Screws commonly used in extruders include single flight metering screws, single barrier screws, double barrier screws, variable pitch flights, multi-start flights, slotted flights and two stage screws such as for vented extruders.

Extrusion processes are usually described as either 'hot', 'warm' or 'cold':

Hot extrusion is done at an elevated temperature to keep the material from work hardening and to make it easier to push the material, particularly if it is passed through a die.

Warm extrusion is done above room temperature, but below the recrystallization temperature of the material. It is often used to achieve a balance between required forces, ductility and final extrusion properties.

Cold extrusion is carried out at or near room temperature. Cold extrusion has certain advantages over hot extrusion including lack of material oxidation, more precise tolerances and good surface finish.

Vulcanization and Devulcanization

Vulcanization is the thermo-chemical process that incorporates sulphur into polymers in order to provide properties that are desired in manufactured polymer products. It is a chemical process for converting rubber or related polymers into more durable materials via the addition of sulphur. It is particularly extensively used in the production of tyres and rubber conveyor belts.

Typically, in order to be able to reuse polymer material from manufactured polymer products, it is first necessary to reclaim the polymer. The principal step of reclamation is devulcanization.

Devulcanization is the process of cleaving the intermolecular bonds of the polymer such as the sulphur-sulphur bonds with further shortening of the polymer chains. This is typically done by chemical, ultrasonic, microwave or biological processing, whist the present invention achieves this mechanically with control of the thermal environment.

The resultant devulcanization of the surface area of the pulverized waste polymer material by the present invention is achieved by utilizing the herein described pulverization extruder for selective cleavage of the sulphur-sulphur bonds by more economical mechanical means of devulcanization by an extruder through intense mechanical working of waste polymeric materials whilst simultaneously subjecting the said waste polymeric materials to variations in temperature ranging from hot extrusion to cold extrusion in the one process run in order to avoid the softening point of the specific polymeric material being batch processed, where the said batch material's softening point is the temperature at which a material softens beyond the softness determined by, for example, the Vicat method (ASTM-D1525 or ISO 306) in order to achieve a solid state polymeric crumb where sulphur-sulphur bonds are cut on the surface area of the said polymeric crumb without total desulphurization of the resultant crumb.

For illustration purposes of the preferred embodiment of the present invention in relation to the devulcanization by the present invention of for example rubber polymeric material reinforced with fiber, the temperature at the upper limit of the hot extrusion procedure reaches a maximum temperature of 300° C. and is then rapidly dropped to room temperature during the same process run to prevent the degradation of the rubber as illustrated in the fiber reinforced rubber degradation experimentation graph shown in FIG. 6, as well as optimize its solid state surface area characteristics of producing a larger surface area relative to the size of the resultant rubber crumb via thermal shock.

The achieved surface area devulcanization of the resultant rubber crumb is demonstrated in the Fourier transform infrared spectroscopy (FTIR) comparative analysis graph shown in FIG. 7.

The FTIR graph shown in FIG. 7 represents the absorbance at specific wavenumbers of the devulcanized rubber crumb output post the pulverization process relative to the control black line absorbance magnitude of vulcanized rubber prior to the pulverization process, with the most significant information obtained from the peaks at 1539 cm$^{-1}$ and 1648 cm$^{-1}$, respectively.

The specific devulcanization process of the present invention enables the product to be more effectually used in downstream processing for industrial applications as the resultant crumb, such as for example rubber crumb, is not degraded due to the typical continuous high temperature generated by pulverization extruders.

Further, as the said resultant crumb of the present invention is not totally desulphurized, the said crumb's usage for downstream industrial vulcanization/re-vulcanization processes produce greater vulcanized products with greater tensile strength which is useful in industry. This phenomenon is contrary to previous beliefs that total desulphurization of vulcanized materials will necessarily result in a more useful product for industrial uses.

The study '*Evaluation of Waste Tyre Devulcanization Technologies—Report for the Integrated Waste Management Board of the State of California*' produced under contract by CalRecovery, Inc. in December 2004 for the Unites States of America's State of California Governor Arnold Schwarzenegger and Secretary, California Environmental Protection Agency Alan C. Lloyd, Ph.D. demonstrated that in relation to devulcanized grades of products "[t]here are no industry or common product specifications and grade definitions. Accordingly, there is no consensus on the devulcanization product grades. The companies promoting and developing devulcanization programs use a mechanism that allows a degree of understanding of the material in question." Further, it was confirmed that "[p]rocess operating conditions such as temperature, residence time, and other process variables can change the devulcanized rubber characteristics."

Further, a study by E. Alan McCaslin titled 'Computer modeling of rubber vulcanization' published in Rubber World, December 2007 confirms that "[e]ven when optimum cure times have been determined, they are subject to change from intentional compound formula modifications or unintended variations in component materials." Specifically, in relation to vulcanization theory, it is confirmed that "[t]here are two predominant systems used for vulcanizing rubber, including organic peroxide and accelerated sulfur." Further, it is disclosed that "it is not possible to express the degree of vulcanization of accelerated sulfur-cured rubbers in terms of percentage of remaining peroxide".

Furthermore, a study by Hamid Yazdani et al titled 'Devulcanization of Waste Tires Using a Twin-Screw Extruder: The Effects of Processing Conditions' (Journal of Vinyl & Additive Technology, 17:64-69, 2011) has demonstrated that there is no direct correlation between a higher percentage of devulcanization and increased tensile strength, where $$\text{Percentage of Devulcanisation} = \frac{v1 - v2}{v1} \times 100$$

and where v1 and v2 are the cross-link density of the samples before and after the devulcanization, respectively.

| Respective samples % of devulcanisation table |||||||||||||
|---|---|---|---|---|---|---|---|---|---|---|---|
| Samples |||||||||||||
| | 1 | 2 | 3 | 4 | 5 | 6 | 7 | 8 | 9 | 10 | 11 | 12 |
| Devulcanisation % | 65 | 75 | 70 | 88 | 65 | 60 | 65 | 83 | 75 | 75 | 80 | 85 |

A graph showing the results set forth in the above table is shown in FIG. 8.

The study also demonstrated that although a combination of screw speed and barrel temperature could break the cross-links selectively, because the methodology's constant barrel temperature measured at the head of the extruder and no control over the internal temperature of the extruder screw, severe degradation could occur.

SUMMARY OF THE INVENTION

An object of the present invention is to provide an extrusion method and device that can produce polymer crumb from waste polymer material that is tailored to suit the requirements of downstream uses with regard to the resultant said polymer crumb size, geometric deformation and surface area devulcanization.

A further object of the present invention is to alleviate at least one disadvantage associated with the related art.

Typically the extruder is to be processing waste polymer material fed as granules or pellets of size 15 mm and smaller through a feeding hopper with a torque controlled feeding screw.

The extruder may be of convenient design such as those having a conventional mechanical or hydraulic drive for the extruder elements. Typically the extruder working zone comprises a single-screw or twin-screw inside a grooved barrel.

The present invention produces polymeric material with a resultantly large variation of percentage of devulcanization, being 80%±20%, utilizing the same methodology as described by Yazdani (2011) dependent on the different batches of end of useful life polymeric materials used, where harder inelastic batches show a lesser percentage of devulcanization than softer elastic batches. This causes the requisitely resultant geometrically deformed and surface area devulcanized polymeric crumb, dependent on the hardness range of the waste polymeric material input ranging from harder inelastic batches devulcanized to 80%−20%, to softer elastic batches devulcanized to 80%+20%, to be made useful in their respective downstream industrial processing.

This outcome of the present invention is achieved by regulating the torque of the feeding hopper screw together with regulating the rotational speed of the main screw of the extruder, in combination with the regulation of the temperatures of the extruder main screw and extruder barrel.

Feeding Hopper

The feeding hopper associated with the present invention incorporates a central feeding screw operated via a torque control mechanism, such as for example a conventional feed-back loop direct torque control method used in variable speed drives to control the torque of three-phase alternating current electric motors or a feed-forward method enabling faster dynamic control of the motor at all speeds, or as in the preferred embodiment a combination of the two methods such as for example described in U.S. Pat. No. 5,101,145, in order to optimize the packing of the polymeric materials into the main screw working area of the pulverization extruder of the present invention which leads to an increased pressure throughput ratio to increase the volume of feedstock being pulverized by the extruder per operating cycle in order to increase its productivity and allowing for a shorter timeframe requirement of the accompanying temperature treatment inside the working zone of the extruder.

For illustration purposes of the present invention, the preferred embodiment is controlled by direct torque control with a variable speed drive with a speed range of 5 to 25 revolutions per minute (RPM) at a frequency of 50 Hertz (Hz).

In addition, the preferred embodiment incorporates a provision for a solids metering device for measured feeding of granules or pellets of size 15 millimeters and smaller, such as for example described in U.S. Pat. No. 3,754,688 and U.S. Pat. No. 4,257,432, concomitant to the central feeding screw.

Grooved Barrel

At least the working zone of the pulverization extruder of the present invention has a grooved barrel for the extruder main screw, since the grooved barrel section cause a high coefficient of friction on the barrel (Decker, 1941) providing the benefits of substantially improved output, substantially improved extrusion stability, and lower pressure sensitivity of the output.

In utilizing this approach, it is important to ensure that mechanical failure of the grooved barrel does not occur, as the method of the present invention will usually cause the device of the present invention to undergo pressures of around 100 MPa (15,000 psi) and up to 300 MPa (45,000 psi), construction of the said pulverization extruder device needs to be designed to withstand such pressures.

Further, since the active edge of the barrel groove is exposed to very high stresses, at least the pulverization extruder working zone barrel and screw components are preferably constructed from through hardened medium and/or high carbon steels.

For illustration purposes of the present invention with preferably a stepped diameter processing screw, the larger diameter barrel internal groove dimensions are shown in FIG. 9A, whilst the smaller diameter barrel internal groove dimensions are shown in FIG. 9B.

Main Screw

The main screw at the working zone of the pulverization extruder has a set of annular elements located within the grooved sleeve, the said annular elements having their inner circumference fashioned to constitute a set of partial threads of substantial depth in the radial direction at one end and gradually sloping off until the other end melts to disappear into the element's inner circumference. The deep end of each partial thread is preferably adjacent the disappearing end of the next partial thread in a circumferential direction, but the said deep and disappearing ends of the adjacent partial threads are offset from each other in an axial direction because of the longitudinal pitch of the partial threads.

The said annular elements are arranged in a staggered relationship in the circumferential direction within the grooved sleeve such that the deep part of each formed partial thread is substantially in axial alignment with the shallow part of the partial thread of the adjacent annular element.

Further, the deep part of each formed partial thread has such a radial dimension so as to substantially be in contact with the contiguous part of the thread of the screw, with the longitudinal pitch of the said partial threads being opposite to the longitudinal pitch of the conjoining portion of the thread of the screw.

For embodiments of the present invention where the working zone of the pulverization extruder is of an increased length in order to process for example harder inelastic polymeric materials by thereby providing a greater length of time to work on the said material and also building up higher back pressures on the said material and for providing a more thorough and uniform temperature treatment for the said material, the longer barrel of the device of the present invention preferably contains de-volatilization vents along the length of the barrel and the longer main screw of the device of the present invention is preferably constructed of jointed successive relatively short sections as described in U.S. Pat. No. 2,946,089 to prevent otherwise long main screw sections becoming misaligned that can be caused to such long main screw sections by the alternate heating and cooling temperatures and accompanying varying pressures of the operation of the present invention.

The said main screw of the pulverization extruder is preferably constructed of a geometry whereby the diameter of its stock gradually decreases from beneath the throat of the feeding hopper until the extrusion die at the forward extremity is reached, with the longitudinal pitch of the thread on the screw preferably decreasing from the rear end to the front end.

Main Screw Speed

Optimized geometric deformation and surface devulcanization of the waste polymer material is achieved within the working zone of the pulverization extruder of the present invention. The rotational speed of the main screw of the said extruder is achieved via a variable speed drive with a top speed of 1,500 revolutions per minute (RPM) at a frequency of 50 Hertz (Hz) working in coordination with the direct torque control of the feeding screw's three-phase alternating current electric motor, with typically a 5 to 1 step down ratio down to 300 RPM ordinarily. For waste polymeric material that requires a step down to a lower RPM, forced ventilation of the main screw motor is required.

Temperature Regulation

Subjecting waste polymeric materials to variations in temperature ranging from hot extrusion to cold extrusion in the one process run provides optimal control of the devulcanization process of the polymeric material being worked, by rapidly reaching the necessary temperatures for cleavage of the sulphur-sulphur bonds which most rapidly occurs on the surface area of the polymeric material and then rapidly dropping the temperature as required to prevent reaching the polymeric material's softening point and degradation of the polymer material.

This said variation in temperatures is achieved by combining the temperature control of the extruder main screw together with the temperature control of the extruder barrel in the one process run, as only controlling the temperature of a the cylindrical barrel of an extruder containing materials for work by either only varying the temperature of the extruder main screw or only varying the temperature of the extruder barrel as is the current industry practice is not sufficient to optimally control the temperature for requisite surface area devulcanization of the polymeric material located within the barrel of an extruder.

This phenomenon has been empirically demonstrated in the study "Heat Transfer and Flow Structures Around Circular Cylinders in Cross-Flow" (Buyruk, Tr. J. of Engineering and Environmental Science, 23 (1999), 299-315.), where for single tube row experiments, if the blockage ratio is less than 0.5, the general shape of the local Nusselt number distribution around the cylinder varies only slightly with blockage. However, the local Nusselt number and pressure coefficient distributions are remarkably different for the blockage ratio in the range of 0.668-0.843, as is typically achieved by optimal packing of polymeric material within the barrel of the extruder around its internal cylindrical-like form main extruder screw for pulverization within the working zone of the said extruder.

Efficient temperature control of the extruder main screw is achieved via an internal central duct, such as for example a copper pipe, situated within a hollow of the internal central longitudinal axis of the extruder main screw, conveying a liquid temperature controlling medium discharged into the said duct, such as for example oil or water utilizing known thermoregulation principles such as for example in relation to utilizing oil described in patent application WO 2002/084124. The said thermal regulatory medium is conveyed towards the extruder head through the internal central duct via a continuous delivery system, such as for example described in patent application WO 2010/006663, and then flows back around the outside of the said duct inside the hollow of the internal central longitudinal axis of the extruder main screw to the thermal regulatory medium temperature control unit, such as for example an automatic mold temperature controller as manufactured for example as described in patent application WO 2005/020285.

Efficient temperature control of the extruder barrel is achieved externally via for example a cooling jackets or an electro-magnetic heat exchanger, such as for example described in patent application WO 2009/053496, utilizing known techniques such as for example alternating phases of coolant injection and phases of forced draining of the jacket to switch promptly between the heating and the cooling configurations (Valigi, Fravolini and Ficola, Control Engineering Practice, Volume 14, Issue 7, July 2006, Pages 783-797) or induction heating as described in patent application WO 2003/063548.

This said temperature regulation of both the extruder main screw and the extruder barrel are coordinated via thermocouple feedback loops between the extruder main screw and extruder barrel in order to achieve the required variations in temperature ranging from hot extrusion to cold extrusion in the one process run of the pulverization extruder required to achieve the desired surface area devulcanization of the resultant rubber crumb of the present invention.

For illustration purposes of the preferred embodiment of the present invention, in processing for example rubber waste polymer material, a rapid hot extrusion phase is achieved by the extruder working zone barrel being set at 300 degrees Celsius with the main screw inside the working zone being simultaneously set at 200 degrees Celsius.

Output

The present invention therefore intentionally creates a downsized deformed polymeric crumb product with a devulcanized surface area, the said product especially not being totally desulphurized in order to assist with the downstream industrial vulcanization/re-vulcanization processes, preferably in relation to the accelerated sulphur-cured route, including assisting with the increased tensile strength and elongation at break percentage of the vulcanization/re-vulcanization product.

The action of the extruder subjects particles of waste polymer to heightened compressive shear and torsion due to the screw rotation of both the feeder hopper screw and the extruder's main screw, thus optimally pulverizing the waste polymer particles.

The polymer particles emerge from the extruder with a smaller particle size, irregular geometric shape, a more porous structure and roughened surfaces, which give the particles an optimally large surface area compared to the size of the particle.

Enhanced mechanical surface area devulcanization is achieved by the intense mechanical working of the waste polymer by the extruder in the presence of alternating hot and warm temperature.

As a result, the present invention produces polymeric crumb from waste polymeric material that when cured for 10 minutes at 160 degrees Celsius results in a tensile strength of a minimum of 16.9 MPa and an elongation at break percentage of a minimum of 424%.

PRIOR ART

The closest prior art methods and/or devices to the present invention include the following:
- U.S. Pat. No. 1,904,884, which does not provide a feeding hopper with torque control of the feed screw together with synchronized temperature regulation of the extruder main screw and extruder barrel, and only produces a cord of crude rubber.
- U.S. Pat. No. 5,503,788, which does not provide a feeding hopper with torque control of the feed screw together with synchronized temperature regulation of the extruder main screw and extruder barrel, and in the main only produces a semi-molten discharge stream.
- WO 2006/105756, which does not provide torque control of the feed screw together with synchronized temperature regulation of the extruder main screw and extruder barrel.
- WO 2011/014902, which does not provide torque control of the feed screw together with synchronized temperature regulation of the extruder main screw and extruder barrel.

Thus, unlike the present invention, the prior art does not provide a feeding hopper with torque control of the feed screw coupled together with speed control of the main screw of the extruder, nor does the prior art provide synchronized temperature regulation of the extruder main screw and extruder barrel as per the present invention to produce crumb with a devulcanized surface area.

BRIEF DESCRIPTION OF THE DRAWINGS

The present invention will now be described with reference to the figures of the accompanying drawings, which illustrate a particular preferred embodiment of the present invention, wherein.

DETAILED DESCRIPTION OF THE PREFERRED EMBODIMENT

Further scope of applicability of embodiments of the present invention will become apparent from the detailed description given hereinafter. However, it should be understood that the detailed description and specific examples, while indicating preferred embodiments of the invention, are given by way of illustration only, since various changes and modifications within the spirit and scope of the disclosure herein will become apparent to those skilled in the art from this detailed description.

Figure 1:
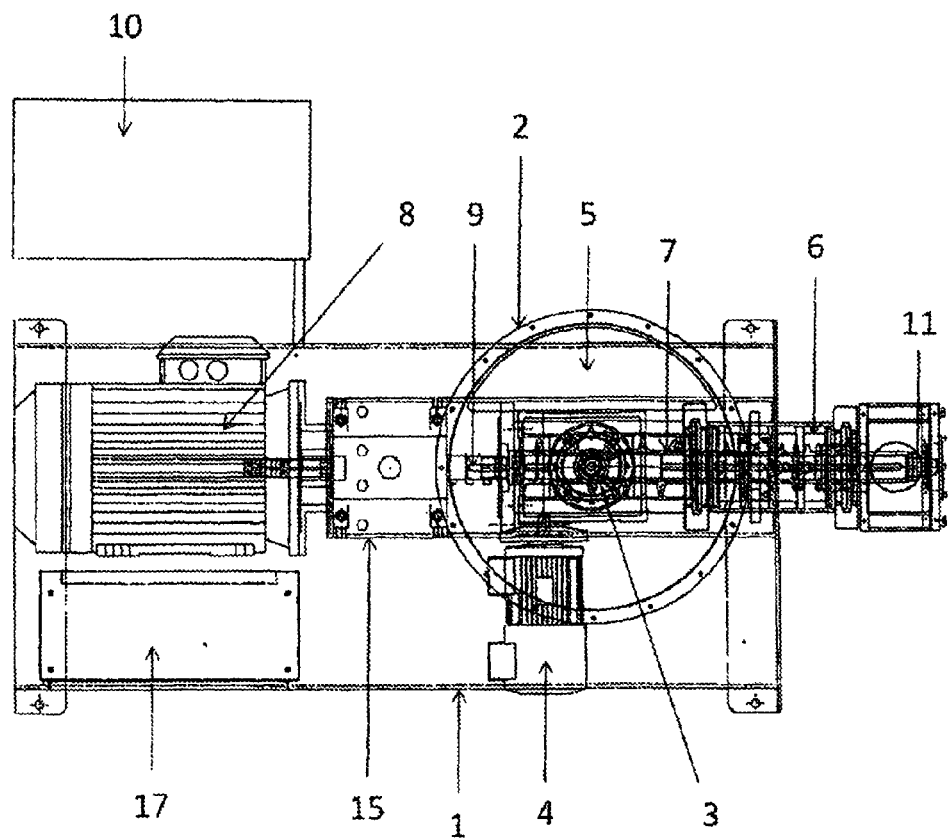
FIG. 1 is a top-down plan view of a longitudinal cross section of the present invention.

The preferred embodiment of the present invention of a polymer pulverization extruder device 1 is constructed to withstand pressures of up to 300 MPa (45,000 psi), and as illustrated in FIG. 1 comprises a feeding hopper 2 for polymeric material incorporating a torque controlled feed screw element 3 with a combination of feed-back and feed-forward loops to best control the torque via the said feed screw's variable speed drive three-phase alternating current electric motor 4 for optimally packing polymeric material into an extruder barrel 6, preferably with the utilization of a solids metering device 5 incorporated in the feeding hopper 2 concomitant to the feed screw element 3, the size of the polymeric materials being placed into the feeding hopper 2 being of size 15 millimeters or smaller.

The polymeric material is packed inside the extruder barrel 6 housing the extruder main screw element 7 preferably controlled by a variable speed drive three-phase alternating current electric motor 8 for heightened compressive shear and torsion pulverization work to be performed conjointly with the optimized packing work of the said torque controlled feed screw element 3 situated within the said feeding hopper 2 as the polymer is conveyed towards the extrusion die 11 for production of a downsized geometrically deformed polymeric crumb product with at least a partially devulcanized surface area.

The main screw element 7 is constructed of a material that enables thermal regulation of the said main screw element 7 within the working zone of the pulverization extruder 1 at least in the range from room temperature to 300° Celsius via the thermal regulatory medium temperature control unit 10 for thermal regulation of the inside of the main screw element 7 and a cooling jackets or an electro-magnetic heat exchanger 15 for thermal regulation of the outside of the extruder barrel 6.

Generally, the main screw element 7 is constructed of a geometry whereby the diameter of its stock gradually decreases from beneath the throat of the feeding hopper 2 until the extrusion die 11 at the forward extremity is reached, with the longitudinal pitch of the thread on the screw 7 decreasing from the rear end to the front end.

For when the working zone of the pulverization extruder 1 is of an increased length for providing a greater length of time to work on certain polymeric material together with build-up of higher back pressures on the said material and a resultant more thorough and uniform temperature treatment for the said material, the longer extruder barrel 6 preferably contains de-volatilization vents along the length of the said barrel 6, and the subsequently longer main screw element 7 is preferably constructed of jointed successive relatively short sections to prevent otherwise long main screw 7 sections becoming misaligned by the alternate heating and cooling temperatures and accompanying varying pressures of the operation of the present invention.

Figure 2:
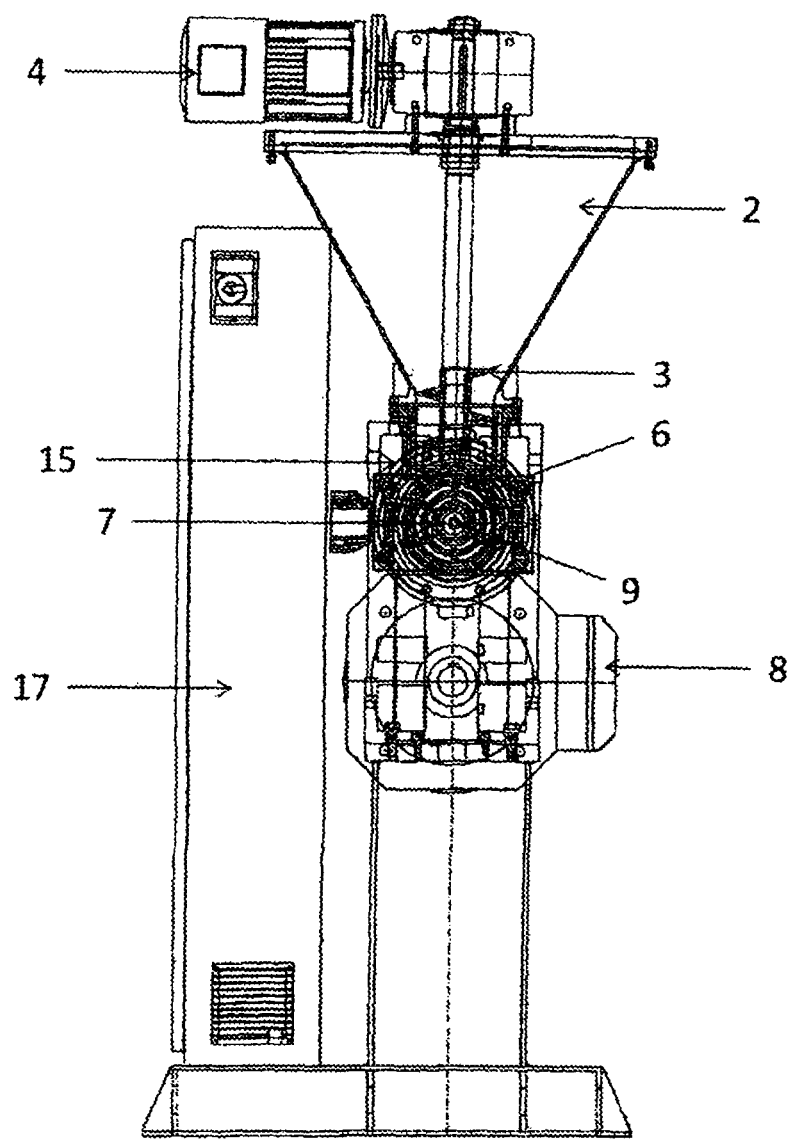
FIG. 2 is a frontal plan view of a radial cross section of the present invention illustrated in FIG. 1.

FIG. 2 illustrates the geometric relationship between the torque controlled feed screw element 3 and the extruder main screw element 7 for their coordinated joint operation by simultaneous control of the feed screw's motor 4 and the extruder main screw's motor 8 via the polymer pulverization extruder main control box 17. The synchronization between the preferably variable speed drive motor 8 of the main screw element 7 and the torque control of the preferably variable speed drive motor 4 of the feed screw element 3 is achieved by a combination of torque regulated motor feedback and feed-forward paths.

Figure 3:
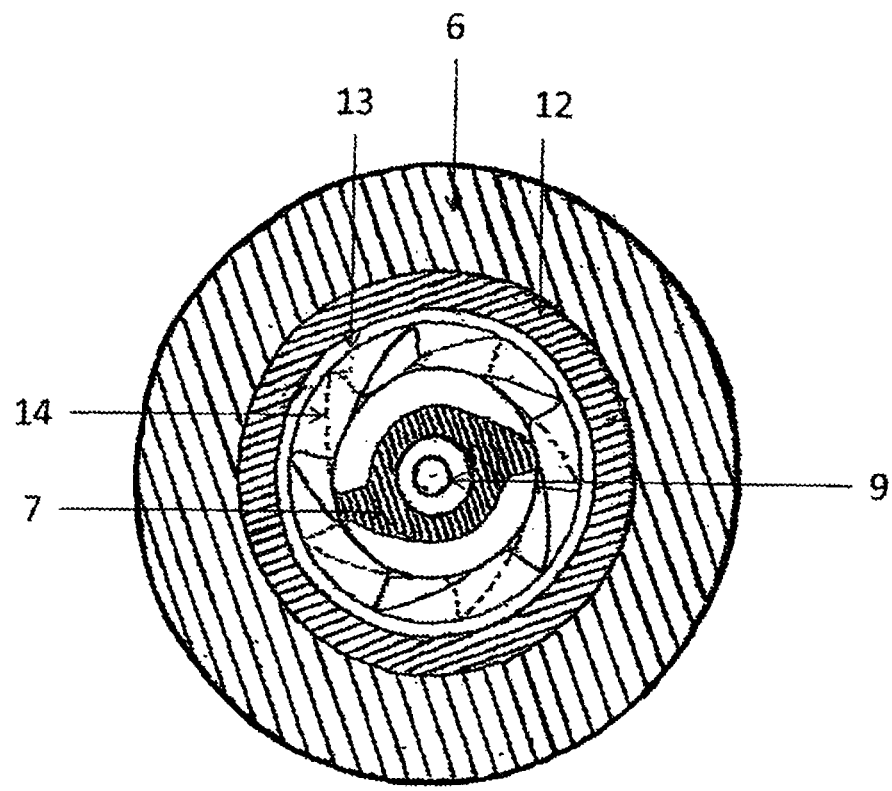
FIG. 3 is a radial cross section of the extruder barrel of the present invention (external thermal regulation element not shown).

In conjunction with the action of the packing torque controlled feed screw element 3, the polymeric material is pulverized inside the extruder barrel 6 by being worked on by the extruder main screw element 7 against the internal grooved sleeve of the barrel 12 as illustrated in FIG. 3 causing a high coefficient of friction on the extruder barrel 6.

For optimizing the geometric deformation of the worked on polymer, the main screw element 7 has a set of annular elements 13 located within the internal grooved sleeve 12, the said annular elements 13 having their inner circumference fashioned to constitute a set of partial threads 14 of substantial depth in the radial direction at one end and gradually sloping off until the other end melts to disappear into the annular elements 13 inner circumference Further, the partial threads 14 have the deep end of each partial thread adjacent to the disappearing end of the next partial thread 14 in a circumferential direction, but the said deep and disappearing ends of the adjacent partial threads 14 are offset from each other in an axial direction because of the longitudinal pitch of the partial threads In addition, the deep part of each formed partial thread 14 has such a radial dimension so as to substantially be in contact with the contiguous part of the thread of the main screw 7, with the longitudinal pitch of the said partial threads 14 being opposite to the longitudinal pitch of the conjoining portion of the thread of the main screw 7.

The requisite devulcanization by the present invention of the polymer material surface area is achieved by the above outlined mechanical work on the polymer material being performed by the feed screw element 3 and the main screw 7 and its associated elements when simultaneously subjecting the said polymer material to controlled variations in temperature inside the extruder barrel 6, ranging from hot extrusion to cold extrusion in the one process run of the polymer pulverization extruder device 1 by rapidly reaching the necessary temperatures for cleavage of the sulphur-sulphur bonds which most rapidly occurs on the surface area of the polymeric material and then rapidly dropping the temperature as required to prevent reaching the polymeric material's softening point and degradation of the polymer material.

The said variation in temperatures is achieved by combining the temperature control of the extruder main screw 7 together with the temperature control of the extruder barrel 6 in the one process run.

The temperature control of the extruder main screw 7 is achieved via an internal central duct 9 situated within a hollow of the internal central longitudinal axis of the extruder main screw 7, the said internal central duct 9 conveying a liquid temperature controlling medium discharged into the said duct 9 towards the extruder die 11 at the head of the extruder via a continuous delivery system and then flows back around the outside of the said duct 9 inside the hollow of the internal central longitudinal axis of the extruder main screw 7 to the thermal regulatory medium temperature control unit 10.

Figure 4:
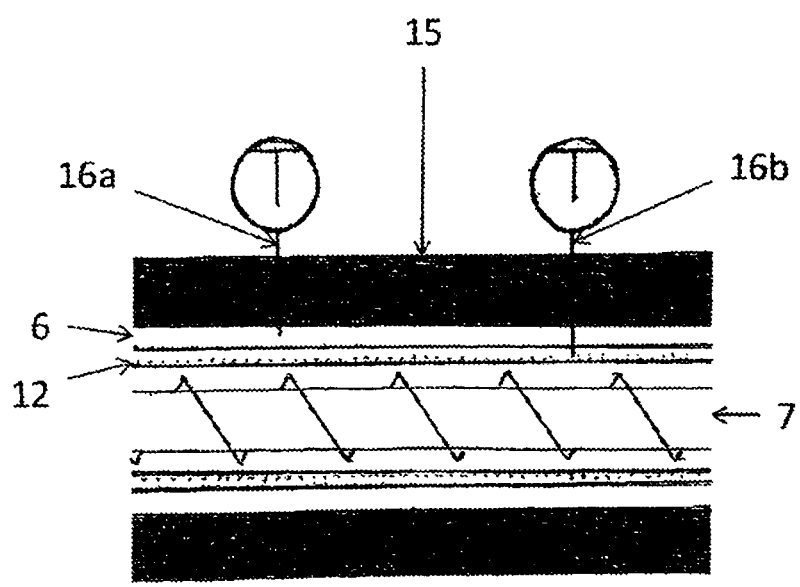
FIG. 4 is a longitudinal cross section of the extruder barrel of the present invention illustrating an external thermal regulation element.

The temperature control of the extruder barrel 6 is achieved externally via for example a cooling jackets or an electro-magnetic heat exchanger 15 as illustrated in FIG. 4.

This said temperature regulation of both the extruder main screw 7 and the extruder barrel 6 are coordinated via thermocouple feedback loops between the extruder main screw 7 and its thermal regulatory medium temperature control unit 10, and the extruder barrel 6 and its external thermal regulation element 15, in order to achieve the required variations in temperature ranging from hot extrusion to cold extrusion in the one process run of the pulverization extruder 1.

Figure 5:
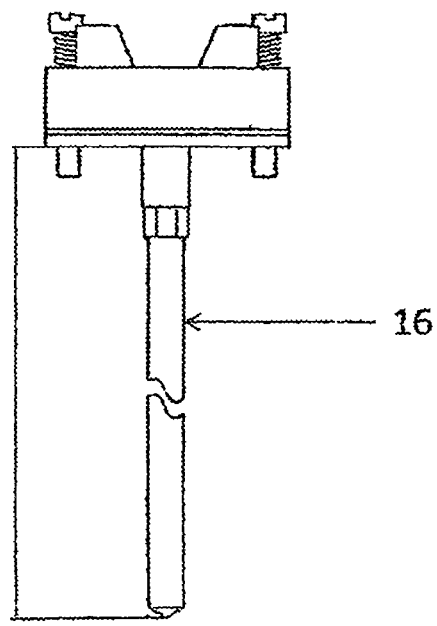
FIG. 5 is an axonometric view of a thermocouple suitable for use in the present invention.
Figure 6:
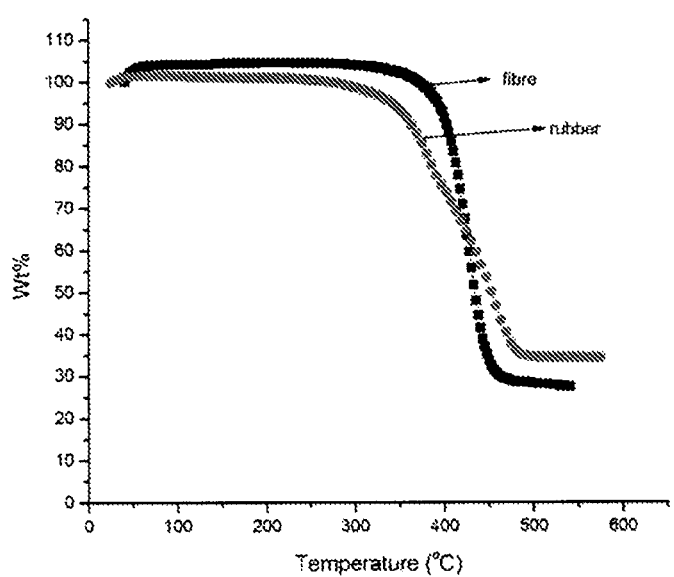
FIG. 6 is a fibre reinforced rubber degradation graph showing loss in weight over time.
Figure 7:
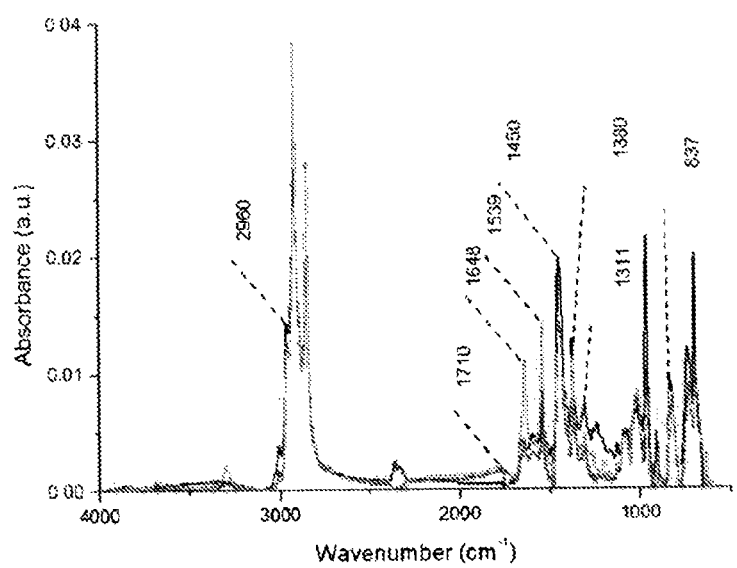
FIG. 7 is an FTIR graph showing devulcanization with reference to wavenumbers 1539 cm$^{-1}$ & 1648 cm$^{-1}$.
Figure 8:
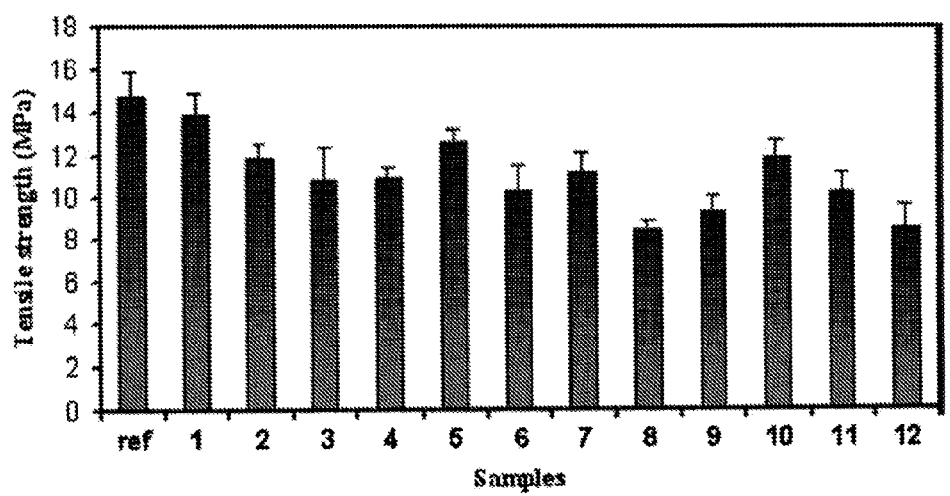
FIG. 8 is a graph showing the reduction in tensile strength of samples 1-12 versus a reference.
Figure 9A:
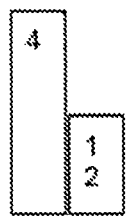
FIGS. 9A and 9B are stepped diameter processing screws with the larger and smaller diameter barrel internal groove dimensions shown in FIGS. 9A and 9B, respectively.
Figure 9A:
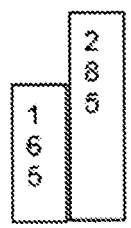
Figure 9B:
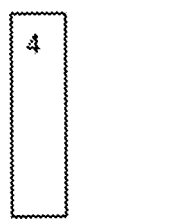
Figure 9B:
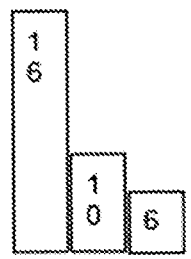

A suitable thermocouple 16 is illustrated in FIG. 5, where the length of the thermocouple 16 is varied with the corresponding depth and thickness of the external thermal regulation element 15 and extruder barrel 6 for thermocouple 16a feedback loop temperature control of the extruder barrel 6, and similarly varied with the corresponding depth and thickness of the external thermal regulation element 15 and extruder barrel 6 as well as the internal grooved sleeve of the barrel 12 for thermocouple 16ba feedback loop temperature control of the extruder main screw 7.

Thus the present invention provides a feeding hopper 2 with torque control of the feed screw 3 coupled together with speed control of the extruder main screw 7 together with synchronized temperature regulation of the extruder main screw 7 and extruder barrel 6 to enable the required work to produce the requisite downsized geometrically deformed polymer crumb with a devulcanized surface area.

The invention claimed is:

1. A method of polymer pulverization for at least partially devulcanizing polymeric materials, the method comprising;
   placing polymeric material into a feeding hopper for action of a torque controlled feed screw element,
   packing the polymeric material under the action of the said torque controlled feed screw element from the feeding hopper into an extruder barrel for combined mechanical and thermal work, and
   pulverizing the packed polymeric material by a main screw element of the extruder contained within its barrel for pulverization work to be performed against an internal grooved sleeve of the barrel, the main screw element utilizing a variable speed drive synchronized with the torque control of the feed screw element, and in combination with joint temperature regulation of both the barrel and the main screw element of the extruder, to provide a downsized geometrically deformed polymeric crumb product with at least a partially devulcanized surface area.

2. A method according to claim 1, wherein the joint temperature regulation of both the said barrel and the said main screw element of the extruder provides thermal regulation of the working zone of the extruder in the range from room temperature to 300° C.

3. A method according to claim 1, wherein the synchronization between the variable speed drive of the main screw element and the torque control of the feed screw element is achieved by a combination of torque regulated motor feed-back and feed-forward paths.

4. A method according to claim 1, wherein the torque controlled feed screw element of the feeding hopper is combined with a means for metering granular materials situated within the feeding hopper.

5. A method according to claim 1, wherein the size of the polymeric materials being placed into the feeding hopper are of size 15 millimeters or smaller.

6. A polymer pulverization extruder device comprising;
   a feeding hopper incorporating a torque controlled feed screw element with a combination of feed-back and feed-forward loops which control the torque of the said feed screw variable speed drive three-phase alternating current electric motor for packing polymeric material into an extruder barrel,
   an extruder barrel housing a variable speed drive operated extruder main screw element for pulverization work to be performed against an internal grooved sleeve of the barrel conjointly with the packing work of the said torque controlled feed screw element situated within the said feeding hopper,
   an internal central duct situated within the hollow of the said extruder main screw at the internal central longitudinal axis of the said extruder main screw for conveying a liquid temperature controlling medium towards the extrusion die end of the said extruder main screw as well as enabling the return backflow of the said liquid temperature controlling medium around the outside of the said duct inside the hollow of the internal central longitudinal axis of the said extruder main screw,
   an external thermal regulation element situated on the outer surface of the said extruder barrel, together with coordinated temperature control of the said internal central duct of the said extruder main screw, and
   thermocouples extending through into the cylindrical body of the extruder barrel to the boundary of the internal sleeve beneath the said extruder barrel, as well as thermocouples extending further through into the body of the said internal grooved sleeve to the boundary of the annular element beneath the said internal grooved sleeve, to regulate the said coordinated temperature control of both the said external thermal regulation element and the said internal central duct.

7. A polymer pulverization extruder device according to claim 6, wherein the main screw element has a set of annular elements located within the internal grooved sleeve, the said annular elements having their inner circumference fashioned to constitute a set of partial threads of substantial depth in the radial direction at one end and gradually sloping off until the other end melts to disappear into the annular elements inner circumference.

8. A polymer pulverization extruder device according to claim 7, wherein the main screw set of annular elements partial threads have the deep end of each partial thread adjacent to the disappearing end of the next partial thread in a circumferential direction, the deep and disappearing ends of the adjacent partial threads are offset from each other in an axial direction because of the longitudinal pitch of the partial threads.

9. A polymer pulverization extruder device according to claim 7, wherein the deep part of each formed partial thread has such a radial dimension so as to substantially be in contact with the contiguous part of the thread of the screw, with the longitudinal pitch of the said partial threads being opposite to the longitudinal pitch of the conjoining portion of the thread of the screw.

10. A polymer pulverization extruder device according to claim 6, wherein the main screw of the device is constructed of jointed successive relatively short sections.

11. A polymer pulverization extruder device according to claim 6, wherein the main screw element is constructed of a geometry whereby the diameter of its stock gradually decreases from the throat of the feeding hopper until the extrusion die at the forward extremity is reached, with the longitudinal pitch of the thread on the screw decreasing from the rear end to the front end.

12. A polymer pulverization extruder device according to claim 6, wherein the polymer pulverization extruder device is constructed to withstand pressures of up to 300 MPa (45,000 psi).

13. A polymer pulverization extruder device according to claim 8, wherein the deep part of each formed partial thread has such a radial dimension so as to substantially be in contact with the contiguous part of the thread of the screw, with the longitudinal pitch of the said partial threads being opposite to the longitudinal pitch of the conjoining portion of the thread of the screw.

14. A polymer pulverization extruder device according to claim 6, wherein the external thermal regulation element is a cooling jacket.

15. A polymer pulverization extruder device according to claim 6, wherein the external thermal regulation element is an electro-magnetic heat exchanger.

* * * * *